(12) United States Patent
    Eguchi

(10) Patent No.: US 10,353,850 B2
(45) Date of Patent: Jul. 16, 2019

(54) CIRCUIT DEVICE, PHYSICAL QUANTITY DETECTION DEVICE, ELECTRONIC APPARATUS, AND MOVING OBJECT

(71) Applicant: Seiko Epson Corporation, Tokyo (JP)

(72) Inventor: Seiji Eguchi, Shiojiri (JP)

(73) Assignee: Seiko Epson Corporation (JP)

( * ) Notice: Subject to any disclaimer, the term of this patent is extended or adjusted under 35 U.S.C. 154(b) by 235 days.

(21) Appl. No.: 14/997,803

(22) Filed: Jan. 18, 2016

(65) Prior Publication Data

US 2016/0217102 A1    Jul. 28, 2016

(30) Foreign Application Priority Data

Jan. 22, 2015  (JP) .................................. 2015-010265

(51) Int. Cl.
    *G06F 13/42*    (2006.01)
    *G06F 13/40*    (2006.01)

(52) U.S. Cl.
    CPC ...... *G06F 13/4282* (2013.01); *G06F 13/4022* (2013.01)

(58) Field of Classification Search
    None
    See application file for complete search history.

(56) References Cited

U.S. PATENT DOCUMENTS

| 4,939,687 | A | * | 7/1990 | Hartley | ................. G06F 7/5275 708/625 |
| 5,012,240 | A | * | 4/1991 | Takahashi | ............... H03M 9/00 341/101 |
| 5,625,353 | A | | 4/1997 | Katagiri et al. | |
| 5,815,089 | A | | 9/1998 | Katagiri et al. | |
| 5,900,824 | A | | 5/1999 | Hayashi | |
| 7,680,228 | B2 | | 3/2010 | Kanekawa et al. | |
| 8,271,700 | B1 | * | 9/2012 | Annem | ................... G06F 13/28 710/22 |
| 2011/0242085 | A1 | * | 10/2011 | Tsuchi | ................. G09G 3/3291 345/212 |

FOREIGN PATENT DOCUMENTS

| JP | 06-208410 A | 7/1994 |
| JP | 10-041963 | 2/1998 |
| JP | 2005-141412 A | 6/2005 |
| JP | 2007-233943 A | 9/2007 |
| JP | 2007233943 A | * 9/2007 |

* cited by examiner

*Primary Examiner* — Henry Tsai
*Assistant Examiner* — John B Roche
(74) *Attorney, Agent, or Firm* — Harness, Dickey & Pierce, P.L.C.

(57) ABSTRACT

A circuit device includes a detection circuit adapted to output first through n-th detection data, and a serial interface adapted to output the first through n-th detection data as serial data. In the case in which i-th detection data ($1 \leq i \leq n$) out of the first through n-th detection data is M bits, and j-th detection data ($1 \leq j \leq n$, $j \neq i$) is N bits ($N < M$), the serial interface outputs the serial data added with (M−N) complementary bits on an MSB side of the j-th detection data.

12 Claims, 15 Drawing Sheets

FIG. 7A

ACC15 | ACC14 | ACC13 | ACC12 | ACC11 | ACC10 | ACC9 | ACC8 | ACC7 | ACC6 | ACC5 | ACC4 | ACC3 | ACC2 | ACC1 | ACC0

COMPLEMENTARY BITS / ORIGINAL DETECTION DATA

FIG. 7B

GYRO15 | GYRO14 | GYRO13 | GYRO12 | GYRO11 | GYRO10 | GYRO9 | GYRO8 | GYRO7 | GYRO6 | GYRO5 | GYRO4 | GYRO3 | GYRO2 | GYRO1 | GYRO0

ORIGINAL DETECTION DATA

FIG. 7C

TEMP15 | TEMP14 | TEMP13 | TEMP12 | TEMP11 | TEMP10 | TEMP9 | TEMP8 | TEMP7 | TEMP6 | TEMP5 | TEMP4 | TEMP3 | TEMP2 | TEMP1 | TEMP0

COMPLEMENTARY BITS / ORIGINAL DETECTION DATA

FIG. 8A

ORIGINAL DETECTION DATA: ACC13, ACC12, ACC11, ACC10, ACC9, ACC8, ACC7, ACC6, ACC5, ACC4, ACC3, ACC2, ACC1, ACC0
COMPLEMENTARY BITS: 0, 0

FIG. 8B

ORIGINAL DETECTION DATA: GYRO15, GYRO14, GYRO13, GYRO12, GYRO11, GYRO10, GYRO9, GYRO8, GYRO7, GYRO6, GYRO5, GYRO4, GYRO3, GYRO2, GYRO1, GYRO0

FIG. 8C

ORIGINAL DETECTION DATA: TEMP11, TEMP10, TEMP9, TEMP8, TEMP7, TEMP6, TEMP5, TEMP4, TEMP3, TEMP2, TEMP1, TEMP0
COMPLEMENTARY BITS: 0, 0, 0, 0

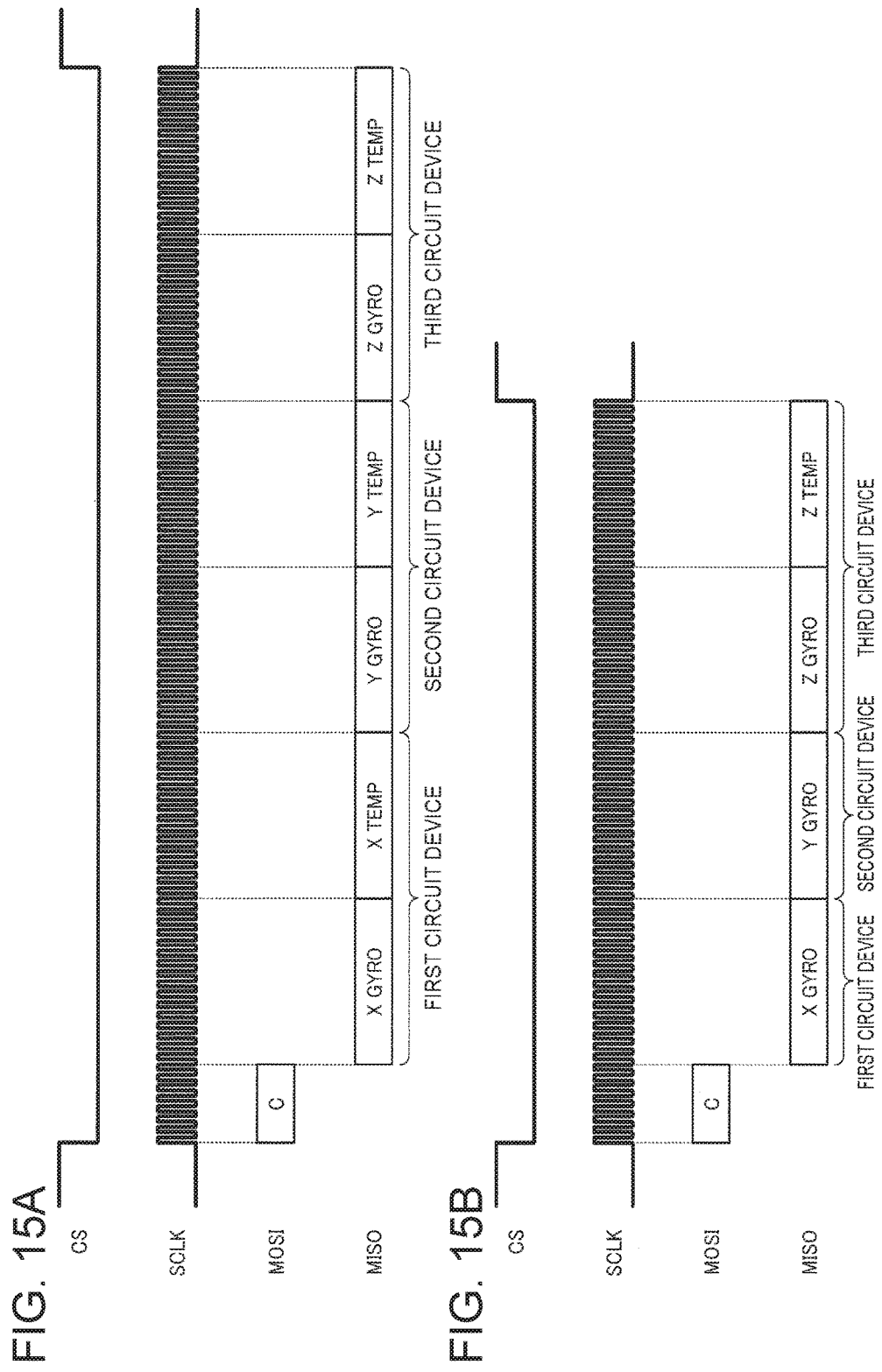

CIRCUIT DEVICE, PHYSICAL QUANTITY DETECTION DEVICE, ELECTRONIC APPARATUS, AND MOVING OBJECT

BACKGROUND

1. Technical Field

The present invention relates to a circuit device, a physical quantity detection device, an electronic apparatus, a moving object, and so on.

2. Related Art

In the past, there has been known an apparatus obtaining and then using outputs of a variety of sensors such as a gyro sensor, a temperature sensor, and an acceleration sensor. These sensors have a possibility of being different in resolution, namely the number of bits used when expressing unit data, from each other. In JP-A-2007-233943 (Document 1), there is disclosed a method of optimizing the bit width signal by signal in order to inhibit the number of bits to be processed from increasing in the case of converting an analog signal output from the sensors different in resolution into a digital signal.

Further, as a communication method between master and slave, there has been known a communication standard called SPI (Serial Peripheral Interface). In JP-A-2005-141412 (Document 2), there is disclosed a method of connecting a master device and a plurality of slave devices to each other with a total of four wiring lines (a clock line, a data-in line, a data-out line, and a chip select line), namely three wiring lines of the SPI system added with the chip select line.

In Document 1, although the bit width is optimized signal by signal, there is a possibility that the bit width is different by data in this case, and it is unachievable to treat the data using a common format on the host side such as a microcomputer. As a result, in the case of attempting to calculate the signals on the host side, the number of processes increases due to a process such as bit-width matching.

Further, as in the system of Document 2, in the case of connecting a host device and a circuit device (device chip) to each other with the serial interface, data from a plurality of sensors are output using a single signal line. On this occasion, if the data are different in bit width from each other, handling of the serial data on the host side becomes difficult. Moreover, in the case in which a plurality of circuit devices is connected to the host device as in the system of Document 2, it results that there increases the possibility that the bit width is different by data.

However, in the related art methods of Document 1 and Document 2 and so on, the difference in bit width between the data in the serial communication is not regarded as a problem, and neither an increase in the processing load on the host side nor complication of the circuit configuration on the host side is considered.

SUMMARY

An advantage of some aspects of the invention is to provide a circuit device, a physical quantity detection device, an electronic apparatus, a moving object, and so on which output a detection data arbitrarily added with complementary bits to thereby simplify the process on the host side.

The invention can be implemented as the following aspects and embodiment.

An aspect of the invention relates to a circuit device including a detection circuit adapted to receive first through n-th (n is an integer no smaller than two) detection signals from first through n-th physical quantity transducers, and output first through n-th detection data, and a serial interface adapted to output the first through n-th detection data as serial data, wherein, in a case in which i-th detection data (i is an integer fulfilling $1 \leq i \leq n$) out of the first through n-th detection data is M bit (M is a positive integer), and j-th detection data (j is an integer fulfilling $1 \leq j \leq n$ and $j \neq i$) is N bit (N is an integer fulfilling $N < M$), the serial interface outputs the serial data added with (M−N) complementary bit on an MSB side of the j-th detection data.

In this aspect of the invention, in receiving the detection signals from the plurality of physical quantity transducers to output the plurality of detection data as the serial data, the data added with the complementary bits as needed is made to be the output target. Thus, since the bit width of the detection data can be adjusted (uniformed in a narrow sense) in the case in which the circuit device receives information from the plurality of physical quantity transducers and then outputs the information, it becomes possible to simplify the process in the receiving side (the host side) of the serial data.

In the above aspect of the invention, the circuit device may further include a format switching register, and the serial interface may output the serial data added with the (M−N) complementary bit on the MSB side of the j-th detection data in a case in which the format switching register is set to a first state, and output the serial data added with the (M−N) complementary bit on an LSB side of the j-th detection data in a case in which the format switching register is set to a second state different from the first state.

According to this aspect of the invention with this configuration, it becomes possible to switch whether the complementary bits are added on the MSB side or added on the LSB side in accordance with the state of the format switching register.

In the above aspect of the invention, in a case in which a two's complement form is set as an output form of the serial data, the serial interface may output the serial data added with the complementary bit corresponding to the two's complement form.

According to this aspect of the invention with this configuration, it becomes possible to output the detection data added with the complementary bits in accordance with the output form of the serial data.

In the above aspect of the invention, in a case in which a data reading command is received from a host device to be connected to a serial data line through which the serial data is output, the serial interface may sequentially output the first through n-th detection data including the i-th detection data and the j-th detection data as the serial data.

According to this aspect of the invention with this configuration, it becomes possible to sequentially (in temporal sequence) output the plurality of detection data corresponding to the plurality of physical quantity transducers with respect to the reading command from the host device.

In the above aspect of the invention, the circuit device may further include a storage section adapted to store output order information representing output orders of the serial data of the circuit device and serial data of another circuit device to a serial data line, through which the serial data is output, in a case in which one or a plurality of other circuit devices is connected to the serial data line, and the serial interface may output the serial data of the circuit device at a timing corresponding to the output order information.

According to this aspect of the invention with this configuration, in the case in which the plurality of circuit devices is connected to the serial data line (the plurality of circuit devices is connected to the host device in a narrow sense), it becomes possible to appropriately set the output orders of the circuit devices, and thus, collision and so on of the serial data can be prevented.

In the above aspect of the invention, the circuit device may further include a processing section adapted to receive the first through n-th detection data from the detection circuit, and add the (M−N) complementary bit to at least the j-th detection data on the MSB side.

According to this aspect of the invention with this configuration, it becomes possible to, for example, perform addition of the complementary bits in the processing section.

In the above aspect of the invention, the detection circuit may include a first A/D conversion circuit adapted to perform an A/D conversion on the i-th detection signal to output the i-th detection data with N bit, and a second A/D conversion circuit adapted to perform an A/D conversion on the j-th detection signal to output the j-th detection data with M bit.

According to this aspect of the invention with this configuration, it becomes possible to, for example, provide the detection circuit with a plurality of A/D conversion circuits.

Another aspect of the invention relates to a circuit device including a detection circuit adapted to receive first through n-th detection signals (n is an integer no smaller than two) from first through n-th physical quantity transducers, and output first through n-th detection data, a serial interface adapted to output the first through n-th detection data as serial data, and a format switching register, wherein in a case in which i-th detection data (i is an integer fulfilling 1≤i≤n) out of the first through n-th detection data is M bit (M is a positive integer), and j-th detection data (j is an integer fulfilling 1≤i≤n and j≠i) is N bit (N is an integer fulfilling N<M), the serial interface outputs the serial data added with the (M−N) complementary bit on an MSB side of the j-th detection data in a case in which the format switching register is set to a first state, and outputs the serial data added with the (M−N) complementary bit on an LSB side of the j-th detection data in a case in which the format switching register is set to a second state different from the first state.

In this aspect of the invention, in receiving the detection signals from the plurality of physical quantity transducers to output the plurality of detection data as the serial data, the data added with the complementary bits as needed is made to be the output target, and at the same time, whether the complementary bits are added on the MSB side or added on the LSB side is switched. Thus, since the bit width of the detection data can be adjusted (uniformed in a narrow sense) in the case in which the circuit device receives information from the plurality of physical quantity transducers and then outputs the information, it becomes possible to simplify the process in the receiving side (the host side) of the serial data, and to flexibly change the addition position of the complementary bits on that occasion.

Another aspect of the invention relates to a physical quantity detection device including the circuit device according to any one of the aspects of the invention described above, and the first through n-th physical quantity transducers.

In this aspect of the invention, it is possible that the first through n-th physical quantity transducers include at least two of an angular velocity sensor, a temperature sensor, and an acceleration sensor.

According to this aspect of the invention, it becomes possible to use at least two elements out of the angular velocity sensor element, the temperature sensor element, and the acceleration sensor element as the physical quantity transducers.

Another aspect of the invention relates to an electronic apparatus including any one of the circuit devices described above.

Another aspect of the invention relates to a moving object including any one of the circuit devices described above.

BRIEF DESCRIPTION OF THE DRAWINGS

The invention will be described with reference to the accompanying drawings, wherein like numbers reference like elements.

FIGS. 7A through 7C are diagrams showing an example of detection data added with complementary bits.

FIGS. 8A through 8C are diagrams showing another example of the detection data added with the complementary bits.

FIGS. 15A and 15B are diagrams showing a configuration example of the input/output frame in the case in which a plurality of circuit devices is connected.

DESCRIPTION OF AN EXEMPLARY EMBODIMENT

Figure 1:
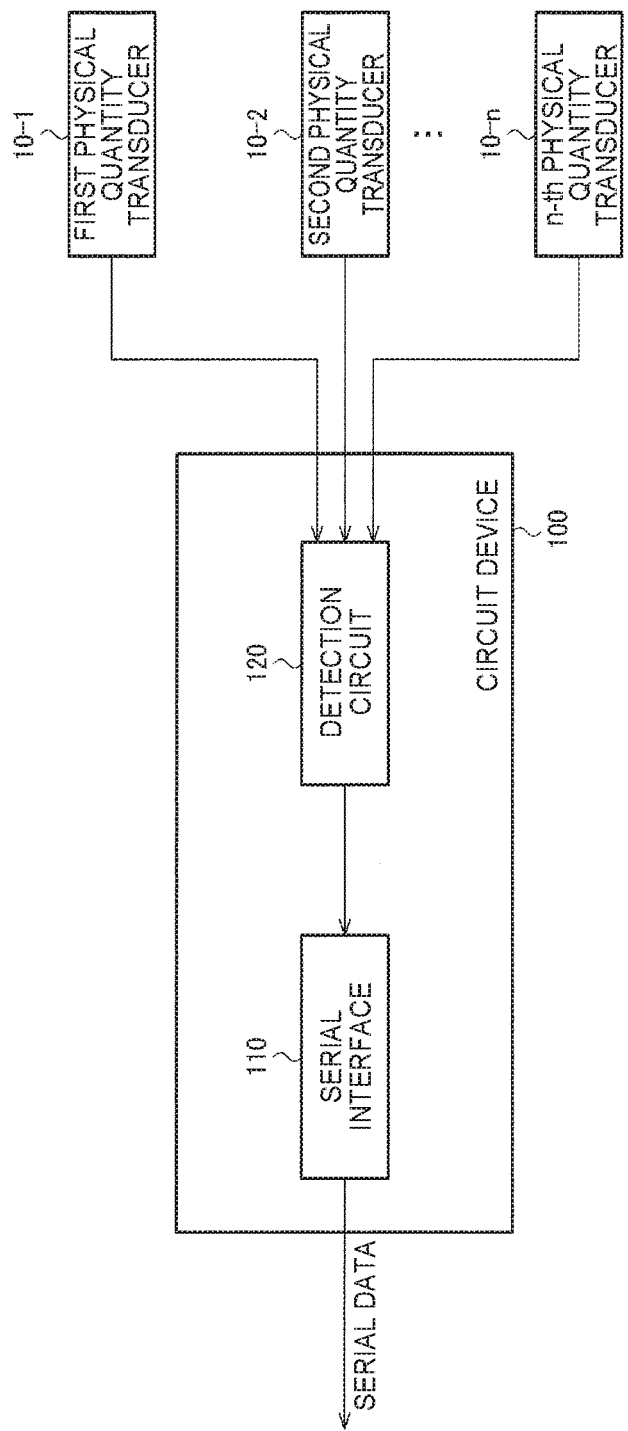
FIG. 1 is a diagram showing a configuration example of a circuit device according to an embodiment of the invention.

Hereinafter, an embodiment of the invention will be explained. It should be noted that the embodiment described below do not unreasonably limit the contents of the invention as set forth in the appended claims. Further, all of the constituents described in the embodiment are not necessarily essential elements of the invention.

1. Method of the Embodiment

Firstly, a method of the present embodiment will be explained. In the case of obtaining signals from a plurality of physical quantity transducers (sensor elements), there is a possibility that the resolution of the signal, namely what bit width is set to the signal when using the detection information from the sensor element as the detection data as a digital signal, is different by the sensor element. In the case of, for example, using elements such as a gyro sensor element, an acceleration sensor element, and a temperature sensor element as the physical quantity transducers, there is a possibility that there occurs a difference in such a manner that whereas one signal of the gyro sensor element is 16 bits, a signal of the acceleration sensor element is 14 bits, and a signal of the temperature sensor element is 12 bits.

Some circuit devices process detection signals from a plurality of physical quantity transducers, and such circuit devices often output a plurality of detection data using a serial interface. In such a case, there arises a necessity of outputting the detection signals of the plurality of physical quantity transducers from a terminal for outputting the data (or a terminal for inputting and outputting the data) out of the serial interface of the circuit device. As an example, as will be described later using FIG. 9 and so on, it is possible to sequentially output the detection signals of the respective sensor elements in atemporal sequence.

In this case, in the case in which the number of bits of the detection data is different between the physical quantity transducers as described above, it becomes difficult to treat the serial data in the host device, which has received the detection data. Specifically, there arises a necessity of performing a process such as bit width matching of the detection data in the host device.

In particular, as will be described later using FIGS. 13 and 14, in the case in which the plurality of circuit devices is connected to the host device, and at the same time, the signal lines are shared between the circuit devices, the detection data are output from the plurality of circuit devices in the signal line used for outputting the detection data from the circuit devices. In this case, the number of physical quantity transducers to be the processing target in the host device becomes significantly large, and the load due to the process such as the bit width matching described above is increased. However, there can be a demand that the user prepares the host device, and combines a variety of types of physical quantity detection devices (sensors, sensor devices) as necessary to thereby process arbitrary sensor information. In other words, the demand for the configuration shown in FIG. 13 and so on is high, and the negative effect due to the difference in bit width between the detection data becomes a considerable problem.

Therefore, the inventors propose the following circuit device. Specifically, as shown in FIG. 1, the circuit device 100 according to the present embodiment includes a detection circuit 120, which receives first through n-th (n is an integer equal to or higher than 2) detection signals from first through n-th physical quantity transducers 10-1 through 10-$n$, and then outputs first through n-th detection data, and a serial interface 110 for outputting the first through n-th detection data as serial data. Further, in the case in which the i-th detection data (i is an integer fulfilling $1 \leq i \leq n$) out of the first through n-th detection data is M bits (M is a positive integer), and the j-th detection data (j is an integer fulfilling $1 \leq j \leq n$ and $j \neq i$) is N bits (N is an integer fulfilling N<M), the serial interface 110 outputs the serial data added with the (M−N) complementary bits on the MSB (most significant bit) side of the j-th detection data.

Here, the first through n-th detection signals are outputs of the physical quantity transducers (inputs of the detection circuit 120), and the first through n-th detection data are an output of the detection circuit 120. Specifically, the detection signals can be analog data, and the detection data can be digital data obtained by an A/D conversion process corresponding to the detection signals.

Further, a variety of types can be adopted as the serial interface, and in the present embodiment, it is also possible to use any of widespread serial interfaces such as three-line SPI (Serial Peripheral Interface), four-line SPI, and I²C (Inter-Integrated Circuit).

Thus, even in the case in which the detection data become different in the number of bits assuming that the method of the present embodiment is not used, it becomes possible to treat the detection data as the data having the same number of bits according to the method of the present embodiment. Therefore, simplification of the process of the host device can be achieved. The physical quantity transducers 10 included in the circuit device 100 can be a one-axis gyro sensor element, or a three-axis gyro sensor element, or modified implementation such as whether or not a temperature sensor element is added to the gyro sensor element, or whether or not an acceleration sensor element is added is possible. In the method of the present embodiment, it is also possible to provide a format of the serial data, which can be compatible with such a variety of products.

Hereinafter, a configuration example of the circuit device 100 (a sensor IC) and a physical quantity detection device 200 including the circuit device 100 will be explained, and then a data format and an input/output frame configuration when uniforming the bit width will be explained. Finally, a modified example in which a plurality of circuit devices 100 is connected to the host device will also be explained using FIG. 13 and so on.

2. System Configuration Example

Figure 2:
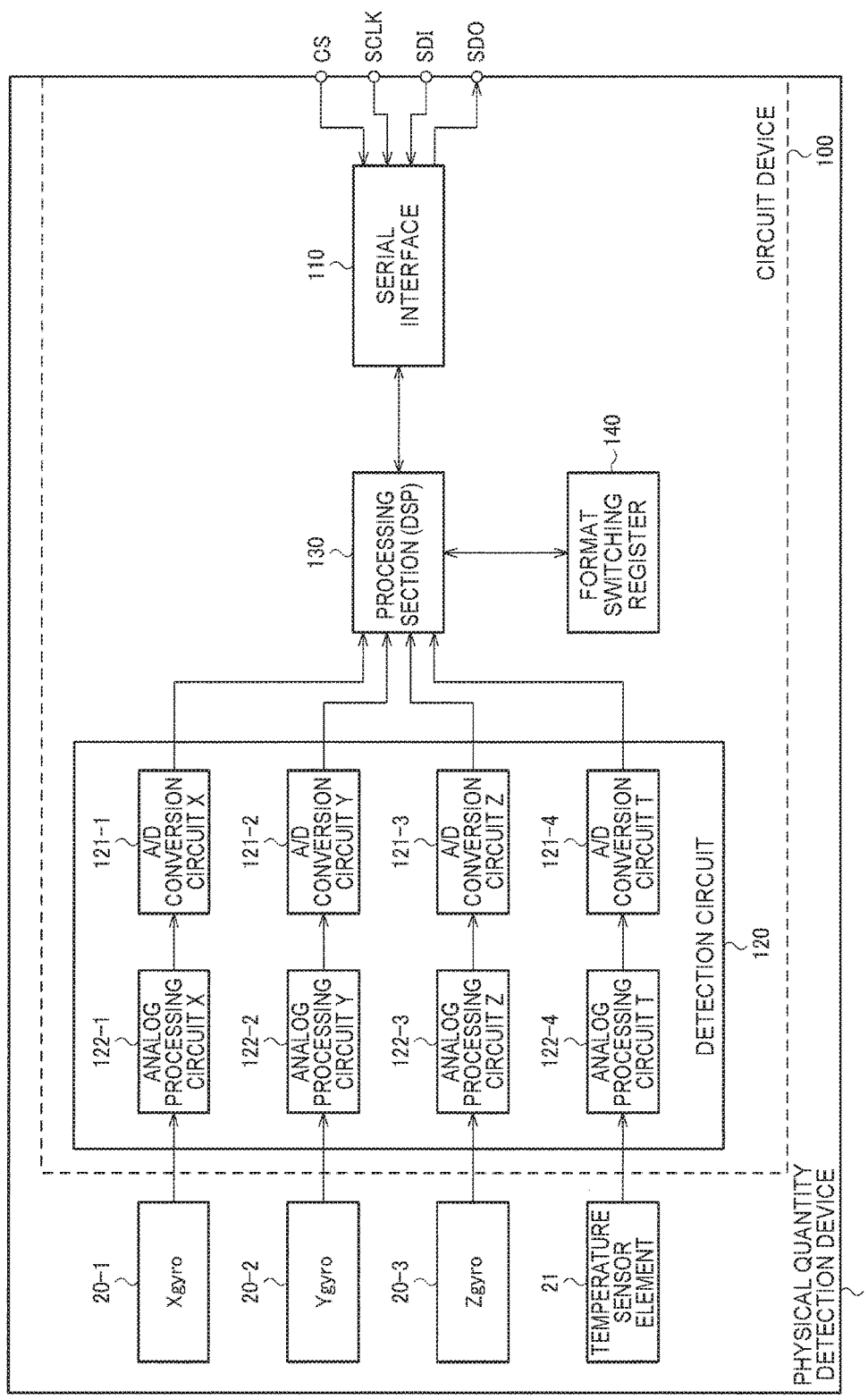
FIG. 2 is a diagram showing a configuration example of a physical quantity detection device including the circuit device according to the embodiment.

FIG. 2 shows a specific example of the circuit device 100 according to the present embodiment, and a configuration example of the physical quantity detection device 200 including the circuit device 100. As shown in FIG. 2, the circuit device 100 includes a serial interface 110, a detection circuit 120, a processing section (DSP) 130, and a format switching register 140. Further, the physical quantity detection device 200 includes the plurality of physical quantity transducers 10 and the circuit device 100. It should be noted that the configuration of the circuit device 100 and the physical quantity detection device 200 is not limited to the configuration shown in FIG. 2, but various practical modifications such as elimination of some of the constituents or addition of other constituents are possible. Further, the point that a variety of practical modifications are possible applies to the configuration shown in FIG. 4 and so on.

Here, the plurality of physical quantity transducers 10 (the first through n-th physical quantity transducers) can also include at least two of the angular velocity sensor (gyro sensor), the temperature sensor, and the acceleration sensor.

In the example shown in FIG. 2, there are shown the gyro sensor (three-axis gyro sensor) element and the temperature sensor element as the physical quantity transducers 10. In other words, the physical quantity transducers 10 can also be an element Xgyro 20-1 for performing angular velocity detection around an X axis of the gyro sensor, an element Ygyro 20-2 for performing angular velocity detection around a Y axis of the gyro sensor, an element Zgyro 20-3 for performing angular velocity detection around a Z axis of the gyro sensor, and the temperature sensor element 21, specifically. It should be noted that a variety of practical modifications such as addition of the acceleration sensor element to the configuration shown in FIG. 2, replacement of either of the gyro sensor element and the temperature sensor element 21 with the acceleration sensor element, and addition of another physical quantity transducer are possible.

Although the serial interface 110 can be realized by a variety of types of serial interface such as the three-line SPI, the four-line SPI, or the I²C as described above, there is shown an example of the four-line SPI in FIG. 2. Therefore, the serial interface 110 is connected to four terminals, namely a chip select terminal CS, a serial clock terminal SCLK, a serial data-in terminal SDI, and a serial data-out terminal SDO.

The detection circuit 120 receives the detection signals from the plurality of physical quantity transducers 10, and then outputs the plurality of detection data. Specifically, since it results that the detection signals output from the physical quantity transducers 10 as analog data are converted into the detection data as digital data, the detection circuit 120 includes an analog-to-digital (A/D) conversion circuit 121 and an analog processing circuit 122.

As an example, the detection circuit 120 can also be a circuit including a first A/D conversion circuit for performing the A/D conversion on the i-th detection signal to output the i-th detection data with N bits, and a second A/D conversion circuit for performing the A/D conversion on the j-th detection signal to output the j-th detection data with M bits. In other words, the detection circuit can also include two or more A/D conversion circuits 121, and can also include as many A/D conversion circuits 121 as corresponding to the number of physical quantity transducers 10 in a narrow sense.

FIG. 2 shows the example of the case in which the number of the physical quantity transducers 10 and the number of the A/D conversion circuits 121 are equal to each other. In this case, the detection circuit 120 can also include an A/D conversion circuit X 121-1, an A/D conversion circuit Y 121-2, an A/D conversion circuit Z 121-3, and an A/D conversion circuit T 121-4 as the A/D conversion circuits 121. The signal from the element Xgyro 20-1 is input to the A/D conversion circuit X 121-1 via an analog processing circuit X 122-1, and the A/D conversion circuit X 121-1 performs the A/D conversion on the detection signal from the element Xgyro 20-1 and then outputs the detection data related to the X axis of the gyro sensor. Similarly, the A/D conversion circuit Y 121-2 performs the A/D conversion on the detection signal from the element Ygyro 20-2 input via an analog processing circuit Y 122-2 and then outputs the detection data related to the Y axis of the gyro sensor, and the A/D conversion circuit Z 121-3 performs the A/D conversion on the detection signal from the element Zgyro 20-3 input via an analog processing circuit Z 122-3 and then outputs the detection data related to the Z axis of the gyro sensor. Further, the A/D conversion circuit T 121-4 performs the A/D conversion on the detection signal from the temperature sensor element 21 input via an analog processing circuit T 122-4, and then outputs the detection data related to the temperature.

It should be noted that as each of the A/D conversion circuits 121, there can be adopted an A/D conversion circuit of a variety of types such as a delta-sigma type or a successive-approximation type. In the case of adopting the delta-sigma type, it is possible to use an A/D conversion circuit having functions such as correlated double sampling (CDS) for reducing the 1/f noise and a chopper, and formed of, for example, a second-order delta-sigma modulator. Further, in the case of adopting the successive-approximation type, it is possible to use an A/D conversion circuit having a function such as dynamic element matching (DEM) for suppressing deterioration of the S/N ratio due to an element variation of DAC, and formed of a capacitive DAC and a successive-approximation control logic.

The A/D conversion circuits 121 can also be the successive-approximation type (successive-approximation register (SAR)), or can also be the delta-sigma type (ΔΣ), and a variety of practical modifications can be adopted regarding the types of the A/D conversion.

Figure 3:
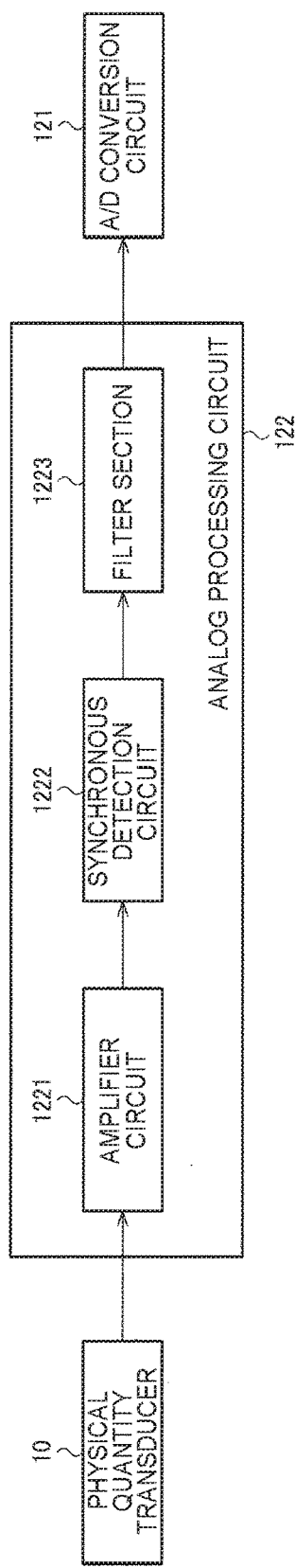
FIG. 3 is a diagram showing a configuration example of an analog processing circuit.

Further, FIG. 3 shows a configuration example of each of the analog processing circuits. As shown in FIG. 3, the analog processing circuits 122 each include an amplifier circuit 1221, a synchronous detection circuit 1222, and a filter section 1223. The amplifier circuit 1221 amplifies the signal from corresponding one of the physical quantity transducers 10. The synchronous detection circuit 1222 performs synchronous detection on the output signal of the amplifier circuit 1221 to extract a desired signal based on a sync signal from a drive circuit not shown. Then, the filter section 1223 performs a low-pass filter process for eliminating an unwanted signal, and then outputs the signal obtained by the process to corresponding one of the A/D conversion circuits 121 as the detection signal of corresponding one of the physical quantity transducers 10. It should be noted that the configuration of the analog processing circuit 122 is not limited to one shown in FIG. 3. It is also possible to omit the filter section 1223 by, for example, providing the function of the low-pass filter to the amplifier circuit 1221, or including the low-pass filter in the A/D conversion circuit 121. Further, in the case in which the two or more analog processing circuits 122 are included in the detection circuit 120 as shown in FIG. 2, it is not required for all of the analog processing circuits 122 to have the same configuration, but it is also possible for the analog processing circuits 122 to have the respective configurations different from each other.

Figure 4:
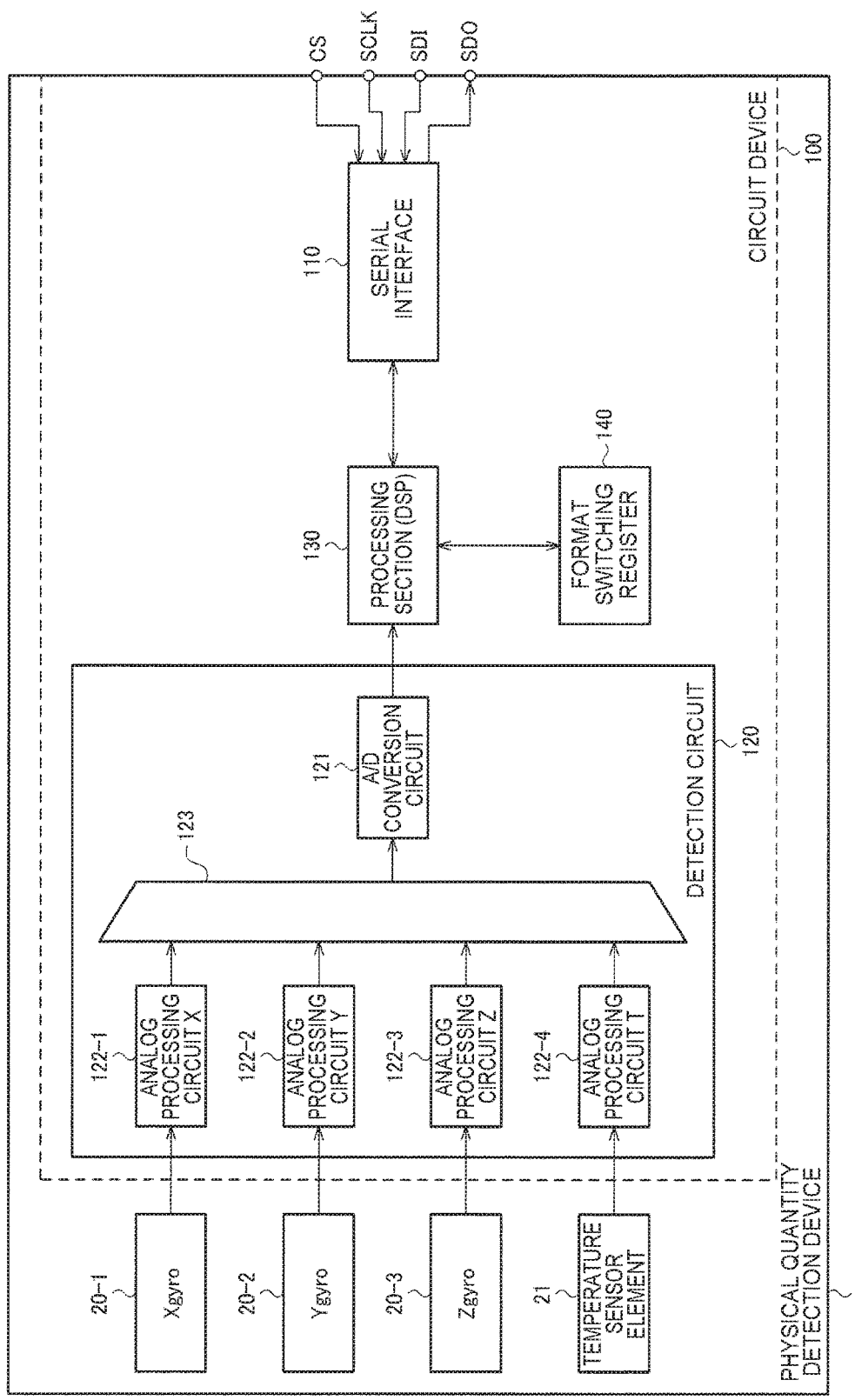
FIG. 4 is a diagram showing another configuration example of the physical quantity detection device including the circuit device according to the embodiment.

Further, the number of the A/D conversion circuits 121 is not limited to two or more, but can also be one. As an example, the detection circuit 120 can also be one including the A/D conversion circuit 121 and a multiplexer 123 as shown in FIG. 4. The multiplexer 123 selects one of the respective detection signals of the element Xgyro 20-1, the element Ygyro 20-2, the element Zgyro 20-3, and the temperature sensor element 21 to output the detection signal thus selected to the A/D conversion circuit 121. The A/D conversion circuit 121 performs the A/D conversion on the detection signal output from the multiplexer 123, and then outputs the detection data. In this case, the A/D conversion circuits are not required to be disposed as many as the number of the physical quantity transducers 10, and it is possible to dispose one A/D conversion circuit as shown in FIG. 4.

Figure 5:
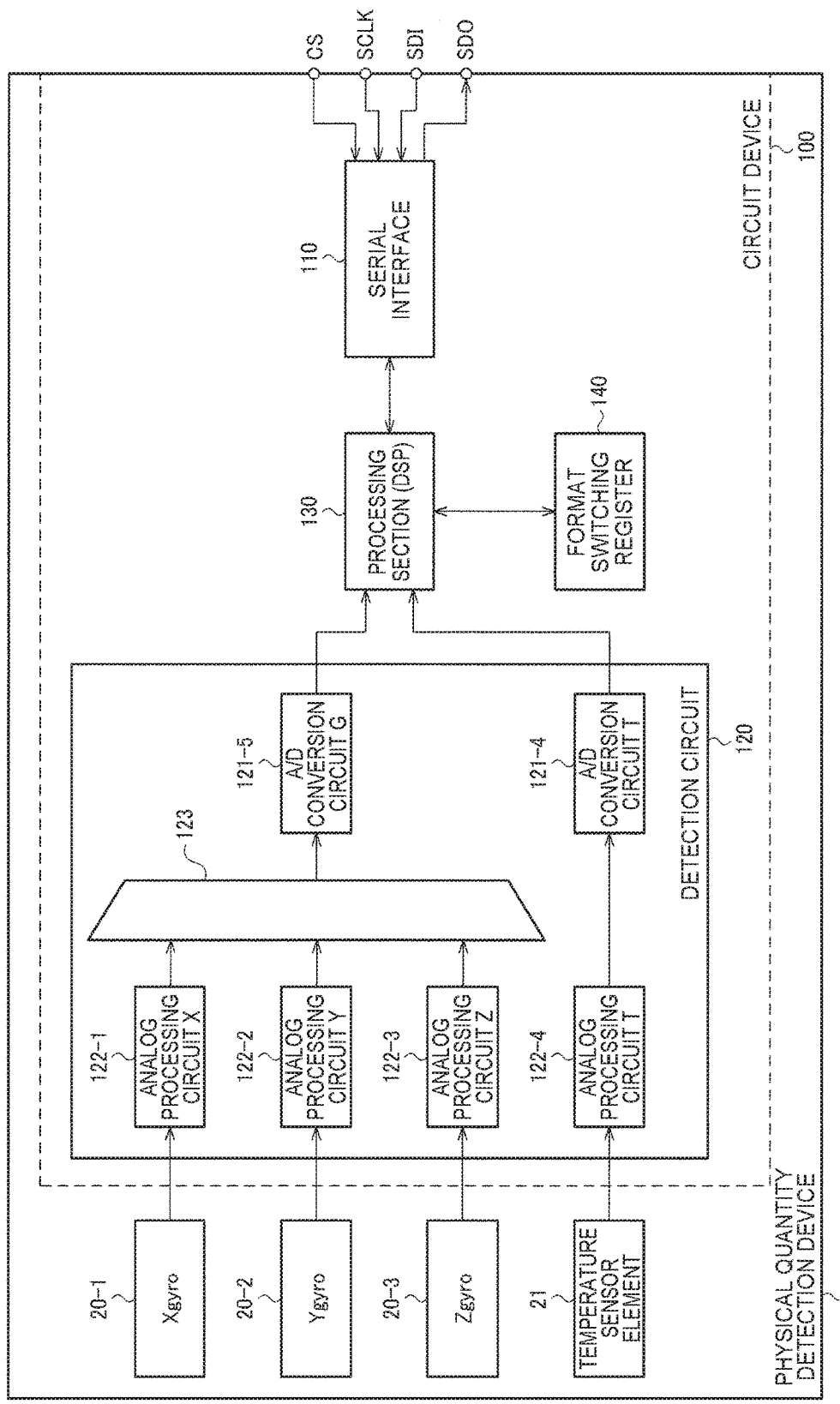
FIG. 5 is a diagram showing another configuration example of the physical quantity detection device including the circuit device according to the embodiment.

Further, although the example of disposing as many A/D conversion circuits 121 as the number of the physical quantity transducers 10 is explained with reference to FIG. 2, and the example of disposing one A/D conversion circuit 121 is explained with reference to FIG. 4, it is also possible to adopt an intermediate practical configuration. For example, as shown in FIG. 5, the detection circuit 120 can also be a circuit including the A/D conversion circuit T 121-4, an A/D conversion circuit G 121-5, and the multiplexer 123. The multiplexer 123 selects one of the respective detection signals of the element Xgyro 20-1, the element Ygyro 20-2, and the element Zgyro 20-3, and then outputs the detection signal thus selected to the A/D conversion circuit G 121-5, and the A/D conversion circuit G 121-5 performs the A/D conversion on the detection signal thus output, and then outputs the detection data related to the gyro sensor element. Further, the A/D conversion circuit T 121-4 performs the A/D conversion on the detection signal from the temperature sensor element 21, and then outputs the detection data related to the temperature. In this case, the two A/D conversion circuits 121 are disposed with respect to the four physical quantity transducers 10.

As described hereinabove, there can be adopted a variety of practical modifications regarding the types of the physical quantity transducers 10 included in the physical quantity detection device 200 and the correspondence between the physical quantity transducers 10 and the A/D conversion circuits 121.

The processing section 130 performs a process using the detection data output from the detection circuit 120. Specifically, the processing section 130 can perform a process of receiving the first through n-th detection data from the detection circuit, and then adding the (M−N) complementary bits to at least the j-th detection data (N-bit data) on the MSB side thereof. Further, as a preparation of the complementing process described above, some process on the detection data can also be performed. For example, instead of using the A/D conversion result of the output of the temperature sensor element 21 directly as the detection data, the detection data can also be obtained by performing a process of obtaining a moving average, a process of correcting the temperature characteristics, a low-pass filter process for eliminating noise, and so on. The processing section 130 can be realized by, for example, a digital signal processor (DSP). The details of the process in the processing section 130 will be described later.

The format switching register 140 stores the information for determining the format of the detection data in the processing section 130. Specifically, whether the complementary bits are added on the MSB side or on the LSB (least significant bit) side is determined in accordance with whether the format switching register 140 is set to a first state or set to a second state. Here, the first state can be the state in which a first value is written into the format switching register 140, and the second state can be the state in which a second value different from the first value is written into the format switching register 140. The format of the detection data in each of the formats will be described later.

It should be noted that although it is assumed in FIG. 2 and so on that the format switching register 140 is used, the circuit device 100 can also be a device including a configuration register for storing configuration information for determining the operation of the circuit device 100 in a wide sense. In this case, it results that the format switching register 140 is realized by a predetermined area of the configuration register.

Further, the method of the present embodiment is not limited to a method to be applied to the circuit device 100, but can also be applied to the physical quantity detection device 200 shown in FIG. 2. In other words, the method according to the present embodiment can be applied to the physical quantity detection device 200 including the circuit device 100 and the physical quantity transducers 10.

Figure 6:
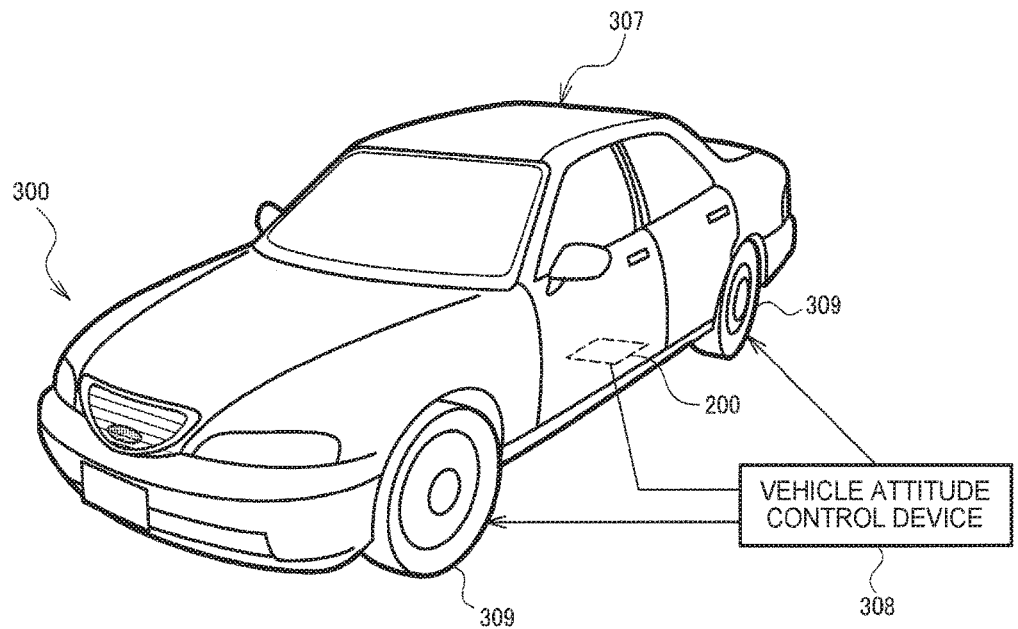
FIG. 6 is a diagram showing an example of a moving object including the physical quantity detection device according to the embodiment.

Further, the method according to the present embodiment can also be applied to an electronic apparatus and a moving object each including the circuit device 100 (an electronic apparatus and a moving object including the physical quantity detection device 200 in a narrow sense). The moving object here corresponds to, for example, a vehicle, an airplane, a motorbike, a bicycle, a ship, or a boat. The moving object is equipment or a device provided with a drive mechanism such as an engine or an electric motor, a steering mechanism such as a steering wheel or a helm, and a variety of electronic apparatuses, and moving on the ground, in the air, or on the sea. FIG. 6 schematically shows a vehicle 300 as a specific example of the moving object. The vehicle 300 incorporates the physical quantity detection device 200 including the physical quantity transducers 10 and the circuit device 100. For example, the physical quantity transducers 10 are vibrator elements (gyro sensor elements), and the physical quantity detection device 200 corresponds to the gyro sensor.

The gyro sensor is capable of detecting the attitude of a vehicle body 307. The detection signals of the gyro sensor can be supplied to a vehicle body attitude control device 308. The vehicle body attitude control device 308 is capable of, for example, controlling the stiffness of the suspension, and controlling the brake of each of the wheels 309 in accordance with the attitude of the vehicle body 307. Besides the above, such attitude control as described above can be used for a variety of moving objects such as a two-legged robot, an airplane, and a helicopter. In realizing the attitude control, the gyro sensor can be incorporated.

3. Addition of Complementary Bits

As described above, in the present embodiment, when converting the detection signals from the physical quantity transducers into the detection data and then outputting the result to the host device, the bit width of the plurality of detection data is uniformed. As an example, if the detection data large in bit width (e.g., M bits) and the detection data small in bit width (e.g., N bits fulfilling N<M) are output in the case in which the process of the present embodiment is not performed, it is sufficient to add (M−N) complementary bits to the detection data small in bit width.

There can be adopted a variety of methods of adding the complementary bits. As an example, it is sufficient that in the case in which the M-bit detection data and the N-bit detection data are respectively output from the A/D conversion circuits 121, the (M−N) complementary bits are added to the N-bit detection data in the processing section 130.

In the present embodiment, the complementary bits are added on the MSB side as described above. In this case, since the bit position (digit) of the original detection data (the N-bit detection data) does not change, it is possible to easily change the bit width without changing the value of the detection data. For example, if the expression form of the detection data is the straight binary form, it is sufficient to add 0 as each of the complementary bits, and thus, the process is easy.

Further, in the case in which the two's complement form is set as the output form of the serial data, it is sufficient to add the complementary bits corresponding to the two's complement form. Specifically, the serial interface 110 outputs the serial data added with the complementary bits corresponding to the two's complement form.

In the case of using the two's complement form, if the MSB of the original detection data is 1, it is sufficient to set the value of each of the complementary bits to 1, and if the MSB of the original detection data is 0, it is sufficient to set the value of each of the complementary bits to 0, and also in this case, the complementary bits can easily be added without changing the value.

FIGS. 7A through 7C show an example of the detection data added with the complementary bits. Here, there is considered an example in which there are obtained three data, namely acceleration data ACC, angular velocity data GYRO, and temperature data TEMP, and the data ACC is 14 bits, the data GYRO is 16 bits, and the data TEMP is 12 bits in the case of assuming that no complementary bit is added.

In this case since the bit width of the data GYRO is large, it is sufficient to perform the process of, for example, matching the bit width of the data ACC and the bit width of the data TEMP with the bit width of the data GYRO. Specifically, the two complementary bits are added to the data ACC, and the four complementary bits are added to the data TEMP. FIG. 7A shows the acceleration data on which the complementing process has been performed, wherein the two bits (ACC15, ACC14) located on the MSB side are the complementary bits, and the other 14 bits (ACC13 through ACC0) correspond to the original detection data. Similarly, FIG. 7C shows the temperature data on which the complementing process has been performed, wherein the four bits (TEMP15 through TEMP12) located on the MSB side are the complementary bits, and the other 12 bits (TEMP11 through TEMP0) correspond to the original detection data. In this example, there is no need to add the complementary bit to the data GYRO as shown in FIG. 7B.

It should be noted that the position where the complementary bits are added is not limited to the MSB side, but the complementary bits can also be added on the LSB side. In the case of adding the complementary bits on the LSB side, since the bit position of the original detection data changes, the value is multiplied by a constant. For example, if bits of 0 are added on the LSB side as the (M−N) complementary bits, the value is multiplied by $2^{(M-N)}$ (compared to the value not added with the bits.

However, in the present embodiment, it is important to assure that the information having a predetermined bit width from a predetermined position represents the information from one of the physical quantity transducers 10 when the host device processes the data from the circuit device 100 (the physical quantity detection device 200). In other words, the point of the present embodiment is to realize the state in which by taking data by predetermined bits (e.g., M bits) without thinking on the host device side, the detection data can appropriately be obtained (the information from a plurality of physical quantity transducers 10 does not exist in a mixed manner in the data with the predetermined bit width). If the point can be achieved, even in the case in which the data value is multiplied by a predetermined value, it is easy to perform an appropriate process such as dividing the value by the predetermined value (to perform a bit operation of rightward shift).

FIGS. 8A through 8C show an example of adding the complementary bits on the LSB side. The bit width of the complementary bits is substantially the same as shown in FIGS. 7A through 7C. It should be noted that in FIG. 8A, the 14 bits from the MSB side correspond to the original detection data (ACC13 through ACC0), and the complementary bits of 0 are added as the two bits located on the LSB side. Similarly, in FIG. 8C, the 12 bits from the MSB side correspond to the original detection data (TEMP11 through TEMP0), and the complementary bits of 0 are added as the four bits located on the LSB side.

As described above, since the complementary bits can be added on the LSB side, in the present embodiment, it is possible to perform switching to the mode of using the LSB side as needed. When performing the switching, it is possible to use the format switching register 140 described above using FIG. 2, for example.

Specifically, the circuit device 100 includes the format switching register 140, and the serial interface 110 outputs the serial data added with the (M−N) complementary bits on the MSB side of the j-th detection data (the N-bit data) in the case in which the format switching register 140 is set to the first state, and outputs the serial data added with the (M−N) complementary bits on the LSB side of the j-th detection data in the case in which the format switching register 140 is set to the second state different from the first state.

According to such a configuration, it becomes possible to arbitrarily switch the bit position where the complementary data is added between the MSB side and the LSB side. Since writing of the data into the format switching register 140 is performed on the host device side via, for example, the serial interface 110, the format of the serial data can be set by the host device side which obtains the serial data. In other words, it becomes possible for the user of the serial data to flexibly set the format desired by the user.

Focusing attention on the format switching described above, the present embodiment can be figured out from another viewpoint. Specifically, the circuit device 100 according to the present embodiment includes the detection circuit 120, which receives the first through n-th (n is an integer equal to or higher than 2) detection signals from the first through n-th physical quantity transducers, and then outputs the first through n-th detection data, and the serial interface 110 for outputting the first through n-th detection data as the serial data, and the format switching register 140. Further, in the case in which the i-th detection data (i is an integer fulfilling 1≤i≤n) out of the first through n-th detection data is M bits (M is a positive integer), and the j-th detection data (j is an integer fulfilling 1≤j≤n and j≠i) is N bits (N is an integer fulfilling N<M), the serial interface outputs the serial data added with the (M−N) complementary bits on the MSB side of the j-th detection data in the case in which the format switching register 140 is set to the first state, and outputs the serial data added with the (M−N) complementary bits on the LSB side of the j-th detection data in the case in which the format switching register 140 is set to the second state different from the first state.

In other words, in this example, whether the complementary bits are added on the MSB side or on the LSB side can freely be set without assuming the addition of the complementary bits on the MSB side.

Further, the addition of the complementary bits is not limited to one performed in the processing section 130. For example, it is also possible to perform the A/D conversion, in which the detection data with a predetermined bit width (e.g., M bits) is output, in the detection circuit 120 (the A/D conversion circuit 121 in a narrow sense). Although in the example of using the processing section 130, the N-bit detection data is once output, and then the (M−N) complementary bits are added to change the bit width to the M bits, in the case of using the A/D conversion circuit 121, the bit width is adjusted to M bits at the time point of the output by the A/D conversion circuit 121.

It should be noted that although the explanation that the detection data small in bit width is made to coincide with the detection data large in bit width (the data having the largest bit width out of the detection data in a narrow sense) is hereinabove described, the invention is not limited to this configuration. For example, it is also possible to perform a process of fitting the bit width to a predetermined bit width.

Specifically, in the case in which the i-th detection data is M bits, and the j-th detection data is N bits (N<M), it is possible to fit the both to K (>M) bits. Specifically, it is also possible to add the K−M complementary bits to the i-th detection data, and to add the K−N complementary bits to the j-th detection data.

For example, as will be described later using FIG. 13, in the case in which the plurality of circuit devices 100 is connected to the host device, from the viewpoint of equally treating all of the detection data, even if the bit width is fitted to that of the detection data having the largest bit width of one circuit device 100, the bit width does not necessarily fit between two or more circuit devices 100. For example, in the case in which the serial data having the bit width fitted to M bits are output from a first circuit device, and the serial data having the bit width fitted to K bits are output from a second circuit device, it is unachievable to treat the detection data as those having the same bit width on the host device side. In this case, it is preferable to fit the bit width to the maximum value of all of the detection data.

Figure 11:
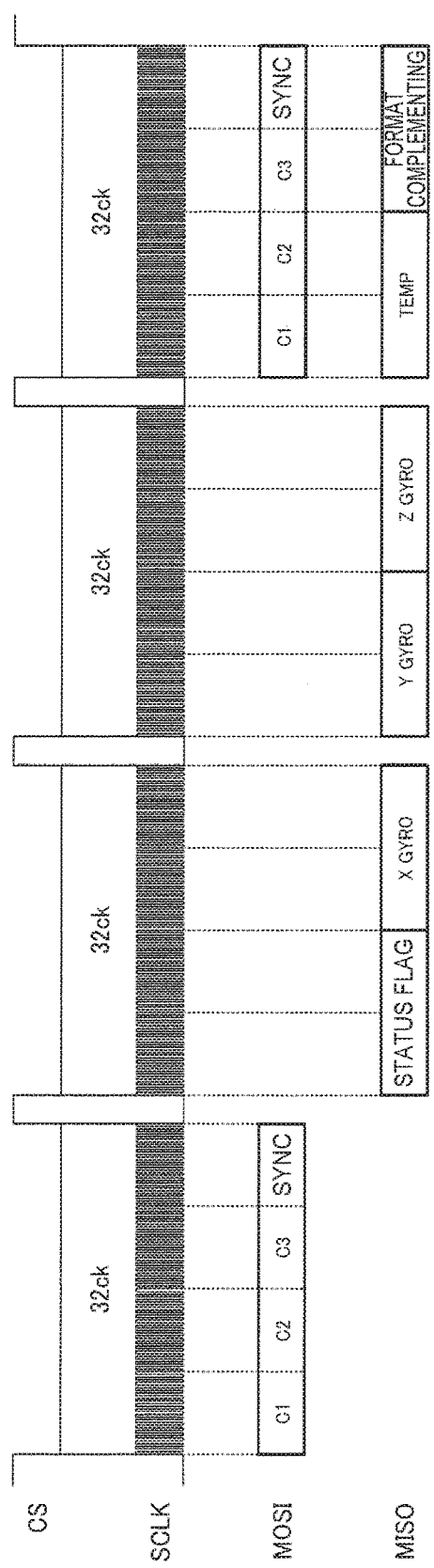
FIG. 11 is a diagram showing a configuration example of the input/output frame in the case of setting the transmission/reception unit to 32 bits.

Further, as will be described later using FIG. 11 and so on, transmission and reception are performed by a specific bit width as a unit in some cases. In such a case, by fitting the bit width of the detection data to the unit of the transmission/reception, efficient communication can be performed. For example, in the case of using 32 bits as the unit as shown in FIG. 11, by uniforming the bit width to a divisor (e.g., 32 bits, 16 bits, or 8 bits) of 32, it is possible to efficiently include one or a plurality of detection data in one unit of the transmission/reception. In contrast, if the bit width is not the divisor of the unit of the transmission/reception, there inevitably occurs the necessity of adding format complementing data for fulfilling the unit in every transmission/reception, and there is a possibility that the effective data transfer rate decreases. In other words, the bit width of the detection data on which the complementing process has been performed can also be determined from a viewpoint different from the maximum bit width of the detection data.

In other words, in the description of the present embodiment, the expression such as "outputting the serial data added with the (M−N) complementary bits on the MSB side of the j-th detection data" is not limited to what represents an embodiment in which the number of the complementary bits is definitely (M−N), but also represents the case in which a larger number of complementary bits than (M−N) are added.

4. Input/Output Frame Configuration

Figure 9:
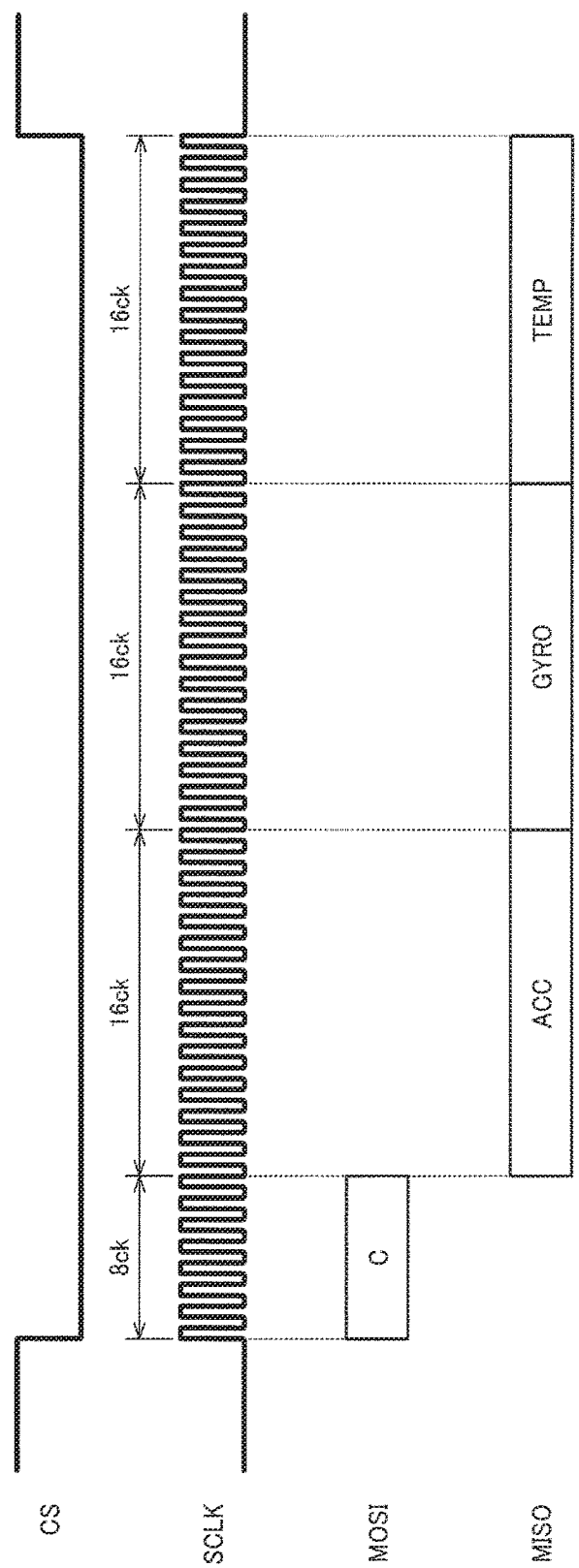
FIG. 9 is a diagram showing a configuration example of an input/output frame.

According to the process described above, the detection data become the data with the predetermined bit width. The serial interface 110 outputs the detection data on which the complementing process has been performed to the host device as the serial data. FIG. 9 shows an example of an input/output frame format of the serial interface 110. It should be noted that FIG. 9 shows a description with an MOSI (Master Out Slave In) terminal and an MISO (Master In Slave Out) terminal, wherein a signal of the MOSI corresponds to a signal of the serial data-in terminal SDI of the circuit device 100, and a signal of the MISO corresponds to a signal of the serial data-out terminal SDO of the circuit device 100.

As shown in FIG. 9, when a signal in the chip select terminal CS turns to LOW, the output from the present circuit device 100 (device chip) is started. Then, the input/output of a clock signal by the serial clock terminal SCLK is started.

The command data C is firstly transmitted from the host device to the circuit device 100 with the MOSI in sync with the clock signal. Although in FIG. 9, the command data C is assumed to be 8-bit data, the command data C is not limited to this configuration. For example, the command data C is data for identifying the reading format of the serial data and the physical quantity transducer 10 as a reading target.

Here, in the case in which a data reading command is received from the host device connected to the serial data line through which the serial data is output, it is also possible for the serial interface 110 to sequentially output the first through n-th detection data including the i-th detection data and the j-th detection data as the serial data. FIG. 9 shows the input/output data in this format, and after receiving the command data C, the serial interface 110 sequentially outputs the acceleration data ACC, the angular velocity data GYRO, and the temperature data TEMP. On this occasion, the detection data to be output are those added with the complementary bits as needed. In other words, in the example shown in FIG. 9, the data ACC, GYRO, and TEMP are all 16-bit data, and each having the format shown in FIGS. 7A through 7C or FIGS. 8A through 8C.

According to this configuration, it becomes possible for the host device to obtain the detection data from the plurality of physical quantity transducers 10 with a single transmission of the command data C. On this occasion, in the case in which the bit width is different by the detection data as in the related art method, it is necessary to previously identify where one detection datum ends and the next detection datum starts in the signal on the MISO, and for example, the process such as bit width matching becomes necessary on the host device side. In contrast, in the present embodiment, by taking the data by 16 bits after transmitting the command data C, the 16-bit data can be treated as the detection data, and therefore, the processing load on the host device side is light. Although it is obvious that additional information becomes necessary to identify whether the 16-bit signal represents the acceleration or represents the angular velocity, at least the possibility of misidentifying the boundary of the data can be suppressed.

Figure 10:
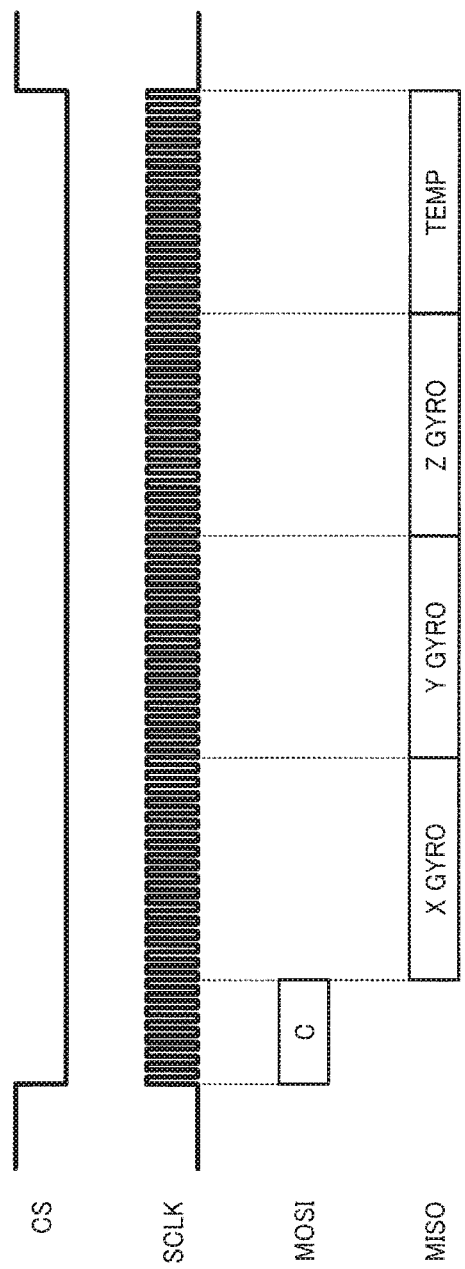
FIG. 10 is a diagram showing another configuration example of the input/output frame.

Although FIG. 9 shows the example in which the detection data are the acceleration data, the angular velocity data, and the temperature data, the detection data are not limited to this example. For example, in the case in which the physical quantity transducers 10 included in the physical quantity detection device 200 are the element Xgyro 20-1, the element Ygyro 20-2, the element Zgyro 20-3, and the temperature sensor element 21 as shown in FIG. 2 and so on, the frame configuration can be the configuration shown in FIG. 10. Although in FIG. 9, the explanation is presented assuming that the angular velocity data GYRO is 16 bits, it is also possible that each of the detection data with respect to the respective axes of the three-axis gyro sensor is 16 bits as shown in FIG. 10.

It should be noted that due to the factor that the process on the host device side is performed by 32 bits, it is possible to adopt a practical modification of configuring the input/output frame by 32 bits. FIG. 11 shows an example of the input/output frame in this case. As shown in FIG. 11, the chip select signal is switched in such a manner as LOW→HIGH→LOW every 32 bits.

The reception of the command data from the host device is also performed by 32 bits. In the example shown in FIG.

11, three 8-bit command data (C1, C2, and C3) and one 8-bit data for synchronization are received in the first 32 bits.

In accordance with the command, the serial data is output from the circuit device 100 to the host device with the MISO. In the example shown in FIG. 11, after receiving the command data and so on, a 16-bit status flag and a 16-bit detection data added with the complementary bits as needed are output in the first 32 bits. Here, the detection data is data X GYRO representing the angular velocity around the X axis. Then, 16-bit data Y GYRO and 16-bit data Z GYRO are output in the subsequent 32 bits, and then, the 16-bit data TEMP and the 16-bit format complementing data are output in the last 32 bits. The format complementing data in this case is the data for fulfilling the transmission/reception unit of 32 bits. In other words, even in the last 32 bits, the detection data (TEMP) is not complemented to 32 bits, but one detection datum remains in 16 bits.

In FIG. 11, the detection data are uniformed to 16 bits, and when performing the transmission/reception by 32 bits, two detection data or one detection datum and another 16-bit datum are output in combination with each other. It should be noted that as shown in FIG. 11, taking the case of continuing the transmission/reception into consideration, it is also possible to communicate the command data or the like for the subsequent data input/output with the MOSI in the last 32 bits.

Figure 12:
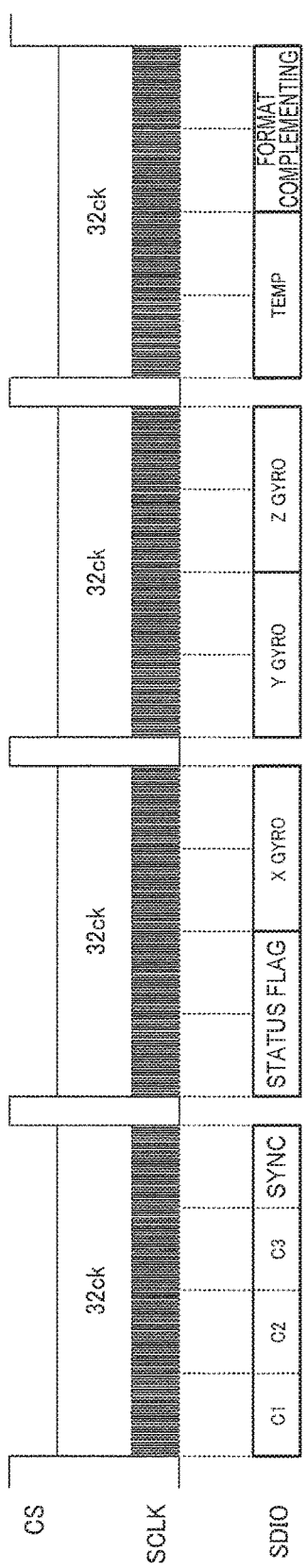
FIG. 12 is a diagram showing another configuration example of the input/output frame in the case of setting the transmission/reception unit to 32 bits.

Further, although the explanation assuming the four-line SPI is hereinabove presented, the serial interface 110 according to the present embodiment can be the three-line SPI as described above. FIG. 12 shows an input/output frame configuration in this case. As shown in FIG. 12, input and output of the data are performed using a single data input/output terminal SDIO. Therefore, it results that both of the input of the command data or the like from the host device and the output of the detection data are performed using the SDIO. In this case, since the communication of performing the transmission of the temperature data and so on and the reception of the subsequent command data at the same time is unachievable as shown in FIG. 11, in the case of continuously outputting the detection data, it is necessary to perform the reception of the command data and so on after ending the output of the temperature data and so on.

5. Modified Examples (Multi-Slave)

Hereinabove, focusing attention to one circuit device 100, there is explained a method of transmitting the detection data as the serial data from the circuit device 100 to the host device. However, the number of the circuit devices 100 to be connected to the host device is not limited to one, but there can be adopted an embodiment in which the plurality of circuit devices 100 is connected to the host device.

Figure 13:
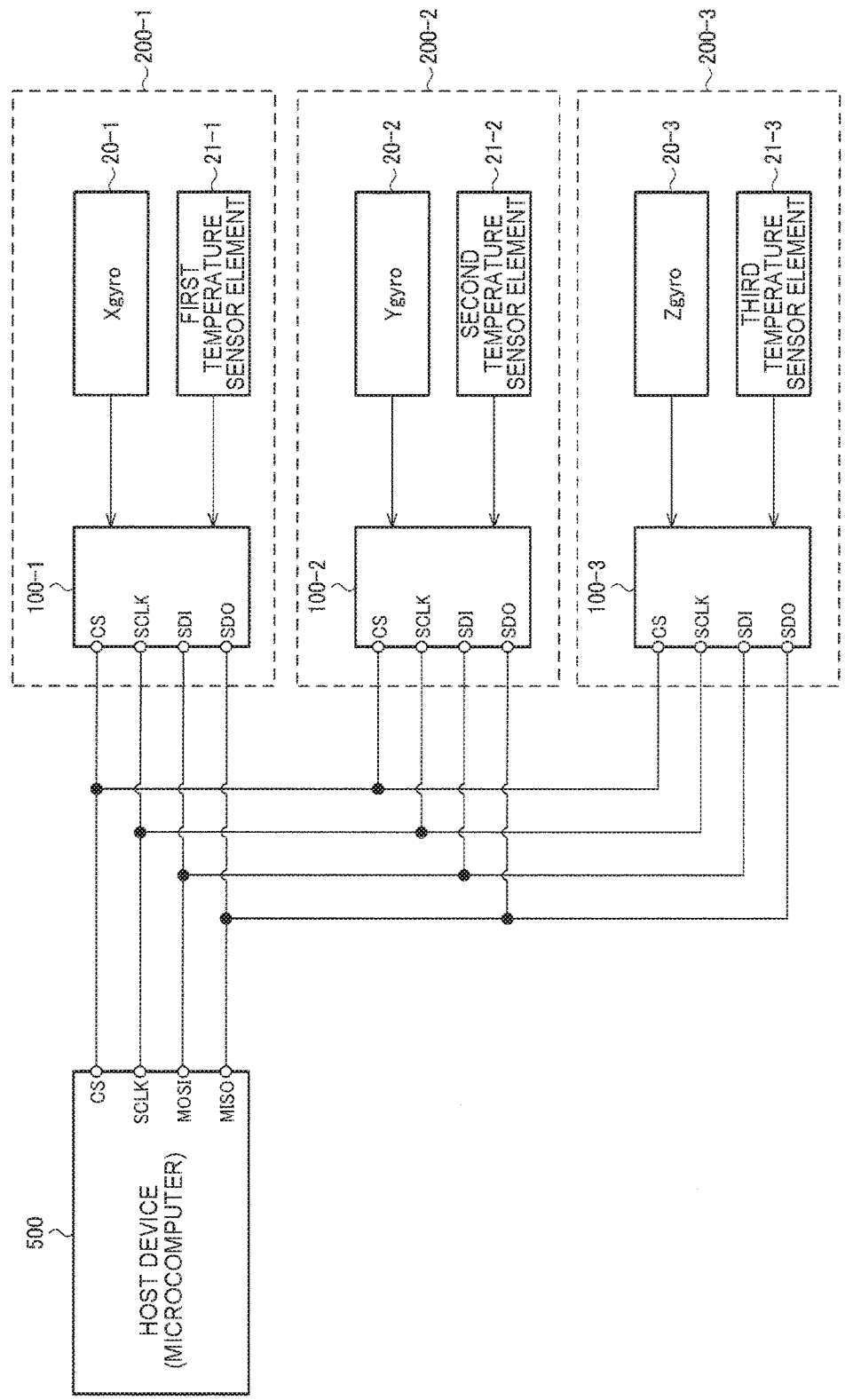
FIG. 13 is a diagram showing a configuration example in the case in which a plurality of circuit devices is connected to a host device.
Figure 14:
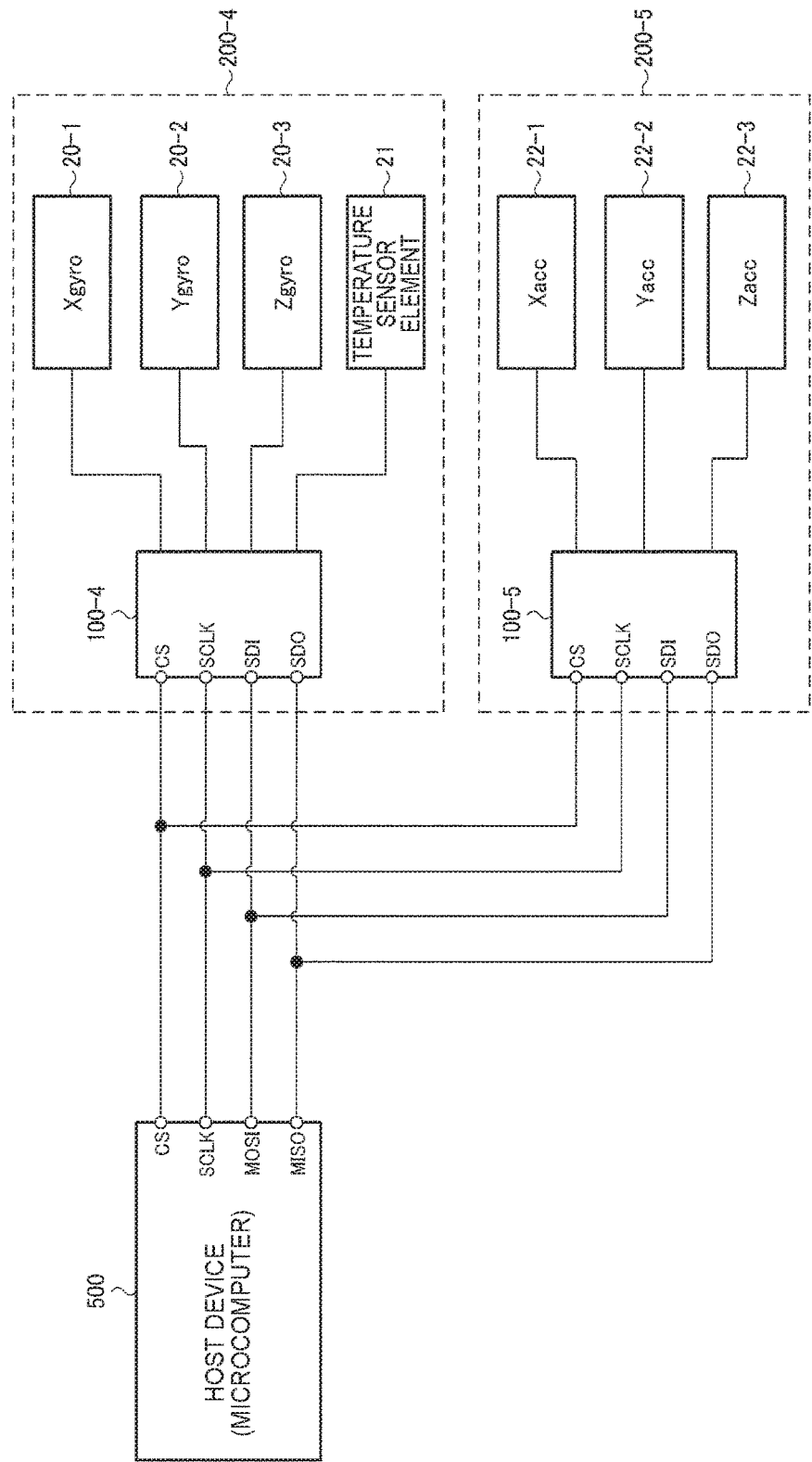
FIG. 14 is a diagram showing another configuration example in the case in which a plurality of circuit devices is connected to the host device.

FIG. 13 shows an example. In FIG. 13, there is shown an example in which the three circuit devices (100-1, 100-2, and 100-3) are connected to the host device (microcomputer) 500. The chip select terminal CS of the host device, the chip select terminal CS of the circuit device 100-1, the chip select terminal CS of the circuit device 100-2, and the chip select terminal CS of the circuit device 100-3 are connected to each other with a common signal line. Further, the host device 500 and the serial clock terminals SCLK of the circuit devices 100-1 through 100-3 are connected to each other, the MOSI of the host device 500 and the SDI of the circuit devices 100-1 through 100-3 are connected to each other, and the MISO of the host device 500 and the SDO of the circuit devices 100-1 through 100-3 are connected to each other.

To the circuit device 100-1, there are connected the element Xgyro 20-1 and a first temperature sensor element 21-1 as the physical quantity transducers 10. To the circuit device 100-2, there are connected the element Ygyro 20-2 and a second temperature sensor element 21-2 as the physical quantity transducers 10. To the circuit device 100-3, there are connected the element Zgyro 20-3 and a third temperature sensor element 21-3 as the physical quantity transducers 10.

In other words, the physical quantity detection device 200-1 including the circuit device 100-1, the physical quantity detection device 200-2 including the circuit device 100-2, and the physical quantity detection device 200-3 including the circuit device 100-3 are each the one-axis gyro sensor and the temperature sensor.

As described above, if it is arranged that the plurality of circuit devices 100 (the physical quantity detection devices 200) are connected to the host device 500, by arbitrarily combining the variety of physical quantity detection devices 200 with each other, it becomes possible to flexibly obtain the information (the detection data) from the desired sensor. For example, also in the case of using the three-axis gyro sensor, it is also possible to use the single physical quantity detection device 200 shown in FIG. 2 and so on, or it is also possible to use the three physical quantity detection devices 200-1 through 200-3 in combination with each other as shown in FIG. 13.

Further, it is also possible to easily deal with the demand of adding another sensor. For example, in the situation in which it is necessary to use not only the information of the angular velocity and the temperature, but also the information of the acceleration, it is sufficient to use the two devices, namely the physical quantity detection device 200-4 similar to the device shown in FIG. 2 and the physical quantity detection device 200-5 dealing with the acceleration sensors, as shown in FIG. 14. Here, the physical quantity detection device 200-4 includes a circuit device 100-4 and the physical quantity detection device 200-5 includes a circuit device 100-5, an element Xacc 22-1 corresponding to the X-axis output of the acceleration sensor, an element Yacc 22-2 corresponding to the Y-axis output of the acceleration sensor, and an element Zacc 22-3 corresponding to the Z-axis output of the acceleration sensor.

It should be noted that in the case of such a configuration, the serial data from the plurality of circuit devices 100 are output to the MISO terminal of the host device 500 using a common signal line. Therefore, if the plurality of circuit devices 100 transmits the serial data at the same time, the data collide with each other to fail to perform appropriate communication.

Therefore, in the present embodiment, in the case in which one or a plurality of other circuit devices 100 is connected to the serial data line through which the serial data is output, each of the circuit devices 100 has a storage section for storing output order information representing the output orders of the own serial data and the serial data of other circuit devices to the serial data line, and the serial interface 110 outputs the own serial data at the timing corresponding to the output order information.

By adopting such a configuration, since the output timing of the respective circuit devices 100 can be separated in temporal sequence, the data collision can be prevented. Although the storage section is not shown in FIG. 2 and so on, it is also possible to use, for example, the configuration register described above as the storage device. FIG. 15A shows a specific example of the input/output frame in the case in which the three circuit devices 100-1 through 100-3 are connected to the host device 500 as shown in FIG. 13.

In the case shown in FIG. 15A, after transmitting the command data C, the serial data from the first circuit device 100-1 is firstly input to the host device 500, then the serial data from the second circuit device 100-2 is input, and finally the serial data from the third circuit device 100-3 is input. In other words, in this case, the first circuit device 100-1 stores the output order information representing the fact that the own output order is the first, and outputs the serial data first in accordance with the output order. Similarly, the second circuit device 100-2 holds the output order information representing the fact that the own output order is the second, and the third circuit device 100-3 holds the output order information representing the fact that the own output order is the third. Specifically, it is sufficient to generate unique output order information defining the output orders of all of the circuit devices representing the fact that the first circuit device 100-1 is the first, the second circuit device 100-2 is the second, and the third circuit device 100-3 is the third, and then store the output order information in the storage section of each of the circuit devices.

In the case in which it is known that the turn to output has come, a variety of methods can be adopted regarding what timing the serial data is actually output. For example, it is also possible to adopt a method of designating the bit width (or the number of detection data) of the serial data of each of the circuit devices 100 by the command data C.

In the case in which each of the circuit devices 100 has two physical quantity transducers 10, and the bit width of the detection data is uniformed to 16 bits as shown in FIG. 13, since it is known that the first output corresponds to the timing of 1 through 32 clocks after receiving the command data C, it is sufficient to output the serial data in sync with the serial clock signal. Specifically, the data X GYRO corresponding to the element Xgyro 20-1 is output in the 1 through 16 clocks, and then the data X TEMP corresponding to the first temperature sensor element 21-1 is output in the 17 through 32 bits.

Similarly, the second output corresponds to the timing of 33 through 64 clocks after receiving the command data C, and the third output corresponds to the timing of 65 through 96 clocks after receiving the command data C.

It should be noted that in FIG. 15A, it is assumed that each of the circuit devices 100 outputs the detection data corresponding to all of the physical quantity transducers 10 connected to the circuit device 100. However, the present embodiment is not limited to this configuration, and it is also possible to assume that the detection data corresponding to some of the physical quantity transducers 10 connected to the circuit device 100 are output.

For example, in the case of the configuration shown in FIG. 13, if the first through third temperature sensor elements 21-1 through 21-3 are mounted at respective positions close to each other, a difference between the detection temperature in the first temperature sensor element 21-1, the detection temperature in the second temperature sensor element 21-2, and the detection temperature in the third temperature sensor element 21-3 is small, and there can be the case in which it is sufficient to use either one of the detection temperatures. In this case, it is also possible to use, for example, the third temperature sensor element 21-3, and to omit the output of the data X TEMP from the first circuit device 100-1 and the output of the data Y TEMP from the second circuit device 100-2.

FIG. 15B shows the configuration example of the input/output frame in this case. Although the output orders, namely the first circuit device 100-1 is the first, the second circuit device 100-2 is the second, and the third circuit device 100-3 is the third, are the same as shown in FIG. 15A, the data X TEMP and the data Y TEMP are omitted, and therefore, the outputs of the first and second circuit devices each become to correspond to 16 clocks. In contrast, the third circuit device 100-3 outputs both of the data Z GYRO and the data Z TEMP using 32 clocks similarly to FIG. 15A.

It should be noted that although the present embodiment is hereinabove explained in detail, it should easily be understood by those skilled in the art that a variety of modifications not substantially departing from the novel matters and the effects of the invention are possible. Therefore, all of such modified examples should be included in the scope of the invention. For example, a term described at least once with a different term having a broader sense or the same meaning in the specification or the accompanying drawings can be replaced with that different term in any part of the specification or the accompanying drawings. Further, the configurations and the operations of the circuit device, the physical quantity detection device, the electronic apparatus, and the moving object are not limited to those explained in the present embodiment, but can be implemented with a variety of modifications.

The entire disclosure of Japanese Patent Application No. 2015-010265, filed Jan. 22, 2015 is expressly incorporated by reference herein.

What is claimed is:

1. A circuit device comprising:
a detection circuit configured to receive first through n-th detection signals from first through n-th physical quantity transducers, and output first through n-th detection data, wherein n is an integer no smaller than two;
a serial interface adapted to output the first through n-th detection data from the circuit device as serial data; and
a format switching register that stores information indicating a format of the detection data in response to inputs received via the serial interface,
wherein the circuit device is configured to determine a format of the detection data,
wherein the serial interface is configured to selectively add (M−N) complementary bits to either a most significant bit (MSB) side or a least significant bit (LSB) side of the detection data, and wherein which of the MSB side and the LSB side of the detection data that the (M−N) complementary bits are added to is based on the determined format of the detection data in accordance with the information stored in the format switching register, and
wherein, in response to a case in which i-th detection data out of the first through n-th detection data is M bits, and j-th detection data is N bits, the serial interface outputs the serial data added with the (M−N) complementary bits on an MSB side of the j-th detection data, wherein i is an integer fulfilling 1<i<n, M is a positive integer, j is an integer fulfilling 1≤j≤n and j≠i, and N is an integer fulfilling N<M.

2. The circuit device according to claim 1,
wherein the serial interface outputs the serial data added with the (M−N) complementary bits on the MSB side of the j-th detection data in a case in which stored information indicates that the format switching register is set to a first state, and outputs the serial data added with the (M−N) complementary bits on an LSB side of the j-th detection data in a case in which the stored information indicates that the format switching register is set to a second state different from the first state.

3. The circuit device according to claim 1, wherein
in a case in which a two's complement form is set as an output form of the serial data, the serial interface outputs the serial data added with the complementary bit corresponding to the two's complement form.

4. The circuit device according to claim 1, wherein
in a case in which a data reading command is received from a host device to be connected to a serial data line through which the serial data is output, the serial interface sequentially outputs the first through n-th detection data including the i-th detection data and the j-th detection data as the serial data.

5. The circuit device according to claim 1, further comprising:
a storage section adapted to store output order information representing output orders of the serial data of the circuit device and serial data of another circuit device to a serial data line, through which the serial data is output, in a case in which one or a plurality of other circuit devices is connected to the serial data line,
wherein the serial interface outputs the serial data of the circuit device at a timing corresponding to the output order information.

6. The circuit device according to claim 1, further comprising:
a processing section adapted to receive the first through n-th detection data from the detection circuit, and add the (M−N) complementary bits to at least the j-th detection data on the MSB side.

7. The circuit device according to claim 1, wherein the detection circuit includes a first analog-to-digital (A/D) conversion circuit adapted to perform an A/D conversion on the i-th detection signal to output the i-th detection data with N bits, and a second A/D conversion circuit adapted to perform an A/D conversion on the j-th detection signal to output the j-th detection data with M bits.

8. A circuit device comprising:
a detection circuit configured to receive first through n-th detection signals from first through n-th physical quantity transducers, and output first through n-th detection data, wherein n is an integer no smaller than two;
a serial interface adapted to output the first through n-th detection data from the circuit device as serial data; and
a format switching register that stores information indicating a format of the detection data in response to inputs received via the serial interface, wherein the circuit device is configured to determine a format of the detection data,
wherein the serial interface is configured to selectively add (M−N) complementary bits to either a most significant bit (MSB) side or a least significant bit (LSB) side of the detection data,
and wherein which of the MSB side and the LSB side of the detection data that the (M−N) complementary bits are added to is based on the determined format of the detection data in accordance with the information stored in the format switching register, and wherein, in response to a case in which i-th detection data out of the first through n-th detection data is M bits, and j-th detection data is N bits, the serial interface outputs the serial data added with the (M−N) complementary bits on an MSB side of the j-th detection data in a case in which the stored information indicates that the format switching register is set to a first state, and outputs the serial data added with the (M−N) complementary bits on an LSB side of the j-th detection data in a case in which the stored information indicates that the format switching register is set to a second state different from the first state, wherein i is an integer fulfilling 1ki<n, M is a positive integer, j is an integer fulfilling 1≤j≤n and j≠i, and N is an integer fulfilling N<M.

9. A physical quantity detection device comprising:
the circuit device according to claim 1; and
the first through n-th physical quantity transducers.

10. The physical quantity detection device according to claim 9, wherein
the first through n-th physical quantity transducers include at least two of an angular velocity sensor, a temperature sensor, and an acceleration sensor.

11. An electronic apparatus comprising:
the circuit device according to claim 1.

12. A moving object comprising:
the circuit device according to claim 1.

* * * * *